US008422767B2

(12) United States Patent
Ligeti (10) Patent No.: US 8,422,767 B2
(45) Date of Patent: Apr. 16, 2013

(54) METHOD AND APPARATUS FOR TRANSFORMING SIGNAL DATA

(75) Inventor: Gabor Ligeti, Budapest Bánki Donát utca (HU)

(73) Assignee: Gabor Ligeti, Budapest (HU)

( * ) Notice: Subject to any disclaimer, the term of this patent is extended or adjusted under 35 U.S.C. 154(b) by 1341 days.

(21) Appl. No.: 12/107,978

(22) Filed: Apr. 23, 2008

(65) Prior Publication Data

US 2008/0260285 A1 Oct. 23, 2008

Related U.S. Application Data

(60) Provisional application No. 60/913,493, filed on Apr. 23, 2007.

(51) Int. Cl.
*G06K 9/62* (2006.01)

(52) U.S. Cl.
USPC ........... 382/156; 382/128; 382/131; 382/155; 382/157; 382/266

(58) Field of Classification Search ................... 382/128, 382/131, 266, 155–156
See application file for complete search history.

(56) References Cited

U.S. PATENT DOCUMENTS

| | | | | |
|---|---|---|---|---|
| 4,217,641 A | * | 8/1980 | Naparstek | 382/131 |
| 4,831,528 A | * | 5/1989 | Crawford et al. | 382/131 |
| 5,262,979 A | * | 11/1993 | Chao | 365/49.1 |
| 5,872,859 A | * | 2/1999 | Gur et al. | 382/128 |
| 6,278,793 B1 | * | 8/2001 | Gur et al. | 382/128 |
| 6,580,936 B2 | * | 6/2003 | Muraki et al. | 600/410 |
| 8,147,503 B2 | * | 4/2012 | Zhao et al. | 606/130 |
| 2003/0161518 A1 | * | 8/2003 | Vuylsteke | 382/128 |
| 2004/0126008 A1 | * | 7/2004 | Chapoulaud et al. | 382/156 |
| 2008/0260285 A1 | * | 10/2008 | Ligeti | 382/276 |
| 2008/0279434 A1 | * | 11/2008 | Cassill | 382/131 |
| 2011/0170751 A1 | * | 7/2011 | Mangoubi et al. | 382/128 |

OTHER PUBLICATIONS

Do, et al., "Volterra-type nonlinear image restoration of medical imagery using principal dynamic modes", IEEE Int'l Symposium on Biomedical Imaging: Macro to Nano; USA, Apr. 15, 2004, pp. 760-763.
Hu, et al., "Classification-based hybrid filters for image processing", Proc. of the Int'l Society for Optical Engineering; vol. 6077; USA, Jan. 18, 2006, 10 pages.

* cited by examiner

*Primary Examiner* — Claire X Wang
*Assistant Examiner* — Gandhi Thirugnanam
(74) *Attorney, Agent, or Firm* — Michael A. Glenn; Glenn Patent Group (57) ABSTRACT

The present invention discloses a system and method of transforming a sample of content data by utilizing known samples in a learning best to best determine coefficients for a linear combination of non-linear filter functions and applying the coefficients to the content data in an operational phase.

20 Claims, 5 Drawing Sheets

METHOD AND APPARATUS FOR TRANSFORMING SIGNAL DATA

CROSS REFERENCE TO RELATED APPLICATIONS

This patent application claims priority under 35 U.S.C. §119 from U.S. provisional patent application No. 60/913,493 filed Apr. 23, 2007 entitled "METHOD AND APPARATUS FOR IMAGE PROCESSING" which is hereby incorporated by reference in its entirety.

BACKGROUND OF THE INVENTION

1. Technical Field

The invention relates to signal processing methods, particularly to calculating values from correlated sample values (such as a neighborhood) in signal enhancement applications.

2. Background

It is a common goal in signal processing to attempt to enhance the quality of given content. Some methods exist to achieve better results than simple linear convolution filters and interpolation methods such as bi-linear filters, tri-linear filters, bi-cubic filters, tri-cubic filters, Laplace filters and Lanczos filters. Another method includes "classifying" the neighborhood using different methods (gradient, pattern matching, clustering, edge detection, optical flow) and select specific convolution filters, or combine convolution filters based on that classification, such as the method described in U.S. Pat. No. 6,133,957. Still another method attempts to calculate appropriate values based on coarser-scale characteristics of the dataset. Some methods then take a least square approach to determine the convolution coefficients for each "class" of neighborhood. In effect, all these methods are defining non-linear filter functions of the neighborhood with some heuristic approach. Most known methods suffer from computational complexity while others suffer from artifacts and mediocre image quality.

SUMMARY OF THE DISCLOSURE

The present invention discloses a system and method of transforming a sample of content data by utilizing known samples in a learning phase to best determine coefficients for a linear combination of non-linear filter functions and applying the coefficients to content data in an operational phase.

In some embodiments of the present invention, the known samples are down-sampled in the learning phase to derive target content used with a transform to determine optimal the coefficients. According to these embodiments, the down-sampled content at least partially resembles the content data.

In some embodiments of the present invention, a pre-selected set of filter functions are used in a combination with a corresponding set of weighting coefficients. According to these embodiments, the derived coefficients values reflect the expected symmetries and/or dependencies of the filter functions.

In some embodiments of the present invention, the content data is obtained from capture devices such as digital still cameras or digital video cameras. In some embodiments of the present invention, the content data is streaming video data. According to these embodiments, low-quality video content (e.g. 480i television content) is able to be transformed into high-quality television content (e.g. 1080p television content). In some other embodiments, the content data is medical imaging data such as MRI or CT data.

In some embodiments of the present invention, an apparatus is used to accept content data, perform the appropriate learning phase processing and operational phase processing and output transformed content data.

In some embodiments of the present invention, optional steps of pre-emphasis, de-emphasis, memory storage, compression and decompression, and de-aliasing are performed.

DETAILED DESCRIPTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Given a class of discrete signals (such as a captured sample or generated values) that has strong correlations among a small number of related samples (such as an abstract "neighborhood"; for example spatially or temporally correlated in one or multiple dimensions in an array), and the need for a filter operator that is a function of said neighborhood samples plus optionally some more variables, it is desirable to transform the discreet signals using one or more optimized filter functions.

In accordance with the present invention, a system and method of content transformation is disclosed by defining optimal coefficients in a learning phase and applying the coefficients to a new sample in an operational phase.

Overview

Figure 1:
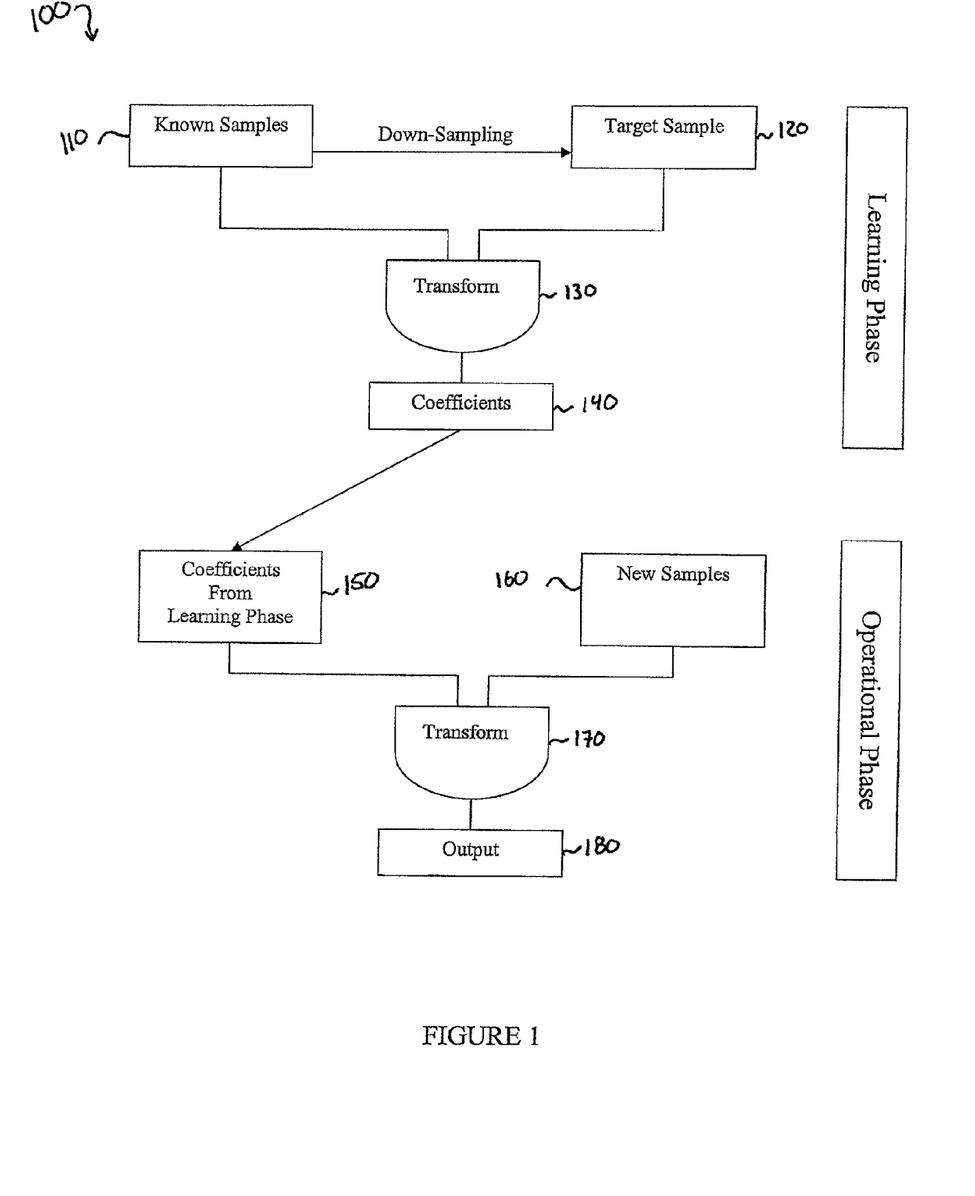
FIG. 1 illustrates a process of defining optimal coefficients in a learning phase and applying the coefficients to a new sample in an operational phase according to the present invention.

FIG. 1 illustrates a process 100 of defining optimal coefficients in a learning phase and applying the coefficients to a new sample in an operational phase according to the present invention. In the learning phase, a known sample 110 is provided representing a desired output for the system. The known sample is then down-sampled to produce a target sample 120. The target sample 120 is so-called because it is the target of a transformation to determine what coefficients best reconstructs the known sample. A transformation function ("transform") 130 is provided that accepts the known sample 110 values and target sample 120 values. In some embodiments of the present invention, the sample values correlate to neighborhood of pixels in an array. In the preferred embodiment of the present invention, the transform 130 is a linear combination set of pre-selected non-linear functions.

The transform 130 is solved using the known samples 110 and the target sample 120, yielding a set of coefficients 140. The returned coefficients 140 are the best coefficients to reconstruct the known sample 110 from the target sample 120.

In an operational phase, the coefficients obtained from the learning phase 150 are applied to a transform 170 along with new samples 160. The transform 170 is the same transform studied in the learning phase. Therefore, the output 180 is transformed to be representative of the original known samples 110.

In some embodiments of the present invention, discrete samples of digital images, recorded digital video signals, interlaced analog television signals, etc. comprise the new samples 160 that are transformed. According these embodiments, high-quality known samples of digital images, digital video signals, deinterlaced digital television signals, etc. are used in the training phase. Preferably the known samples 110 are of a very high quality such that when they are subsequently down-sampled, the resulting target samples will emulate the new signals. It will be readily apparent to those having ordinary skill in the art that although specific examples are given for the new samples 160 and known samples 110, the present invention is equally applicable to all appropriate transformable content, now known or later developed.

In some embodiments of the present invention, a step of determining the appropriate transform 130 to perform is done manually. In other embodiments, the appropriate transform 130 is known. In the preferred embodiment, the transform 130 is a linear combination of pre-selected non-linear functions. The most common examples of such filter functions are interpolations (with added parameters defining the relative position of the continuous point within the pixel), convolutions that are linear functions of said neighborhood samples, or filters such as noise reduction, edge enhancement, sharpening, etc. There exists other non-linear filter functions also commonly used, such as Xin-Li method for resolution enhancement, combinations of convolutions weighed by gradients. Although specific filter functions are disclosed, it will be readily apparent to those having ordinary skill in the art that any useful filter function, now known or later developed, may be used for image enhancement according to the present invention.

Exemplary Embodiment

In exemplary embodiments of the present invention, the set of filter functions is a set of pre-selected (not necessarily linear) primary functions of the neighborhood (and optionally additional parameters). According to these embodiments, the class of functions may be defined by the possible linear combinations of these pre-selected functions with arbitrary weights or coefficients, such as $$y = \sum_{i=1}^{N} a_i f_i(s_0, s_1, s_2, \ldots, s_n, p_1, \ldots, p_m) \quad (1)$$

or in short, $$y = \sum_{i=1}^{N} a_i f_i(\underline{s}, \underline{p}) \quad (2)$$

where $s_i$ ($1 \leq i \leq n$) are the discrete values of a given neighborhood of $s_0$ and $p=p_1, p_2, \ldots, p_m$ are optional additional parameters, and $f_i(s,p)$ ($1 \leq i \leq N$) are the pre-selected primary filter functions. Each specific set of $a_i$ coefficients define a specific filter function within this class.

In some embodiments, the optional parameters, $p=p_1, p_2, \ldots, p_m$ create an $f(x,y)$ or $f(x,y,z)$ function that would best approximate the continuous original source within the sample where z may is a third dimension value in space or time. In some embodiments, the optional parameters allow a single filter to be trained to perform arbitrary scaling/upscaling/zooming even to non-integer factors, or changing the frame rate (if the z denotes the time scale in case of a video signal) arbitrarily by a single filter.

The training set is a large set of samples along with their respective known desired y values that we wish to approximate with a filter function. The system can then take the training set in the training phase, and find the coefficients such that the difference of the desired y values and the value of the $F(s, p)$ is the smallest in some metrics; and then use the filter defined by those coefficients in the operational phase. There are many options including iterative, Gauss, neural network and other methods to accomplish this.

One preferred method described below is regression, that can find the best coefficients for the above defined class of filter functions so that the specific function within that class defined by those coefficients will best approximate the a-priori desired values of the said sample in "mean square error" or PSNR (peak signal to noise ratio) terms.

According to this exemplary embodiment, for a given training set, consisting of a large set of $s_o^j$ and corresponding $s_i^j$ ($1 \leq j \leq M$) ($1 \leq i \leq n$) and $p^j$ parameter values with desired $y^j$ values we want to determine the best possible $a_i$ coefficients.

With the notation $s'^j_i = f_i(s_0^j, s_1^j, s_2^j, \ldots, s_n^j, p^j)$ ($1 \leq i \leq N$) one possible method is to create the matrix $$S = \begin{bmatrix} s'^1_1 & s'^1_2 & \cdots & s'^1_N \\ s'^2_1 & s'^2_2 & \cdots & s'^2_N \\ \cdots & \cdots & \cdots & \cdots \\ s'^M_1 & s'^M_2 & \cdots & s'^M_N \end{bmatrix} \text{ and the vector } \underline{y} = \begin{bmatrix} y^1 \\ y^2 \\ \cdots \\ y^M \end{bmatrix}$$

with the unknown coefficients being $$\underline{a} = \begin{bmatrix} a_1 \\ a_2 \\ \vdots \\ a_N \end{bmatrix}$$

and then the problem can be formulated as solving the system of linear equations $$\begin{bmatrix} s'^1_1 & s'^1_2 & \cdots & s'^1_N \\ s'^2_1 & s'^2_2 & \cdots & s'^2_N \\ \cdots & \cdots & \cdots & \cdots \\ s'^M_1 & s'^M_2 & \cdots & s'^M_N \end{bmatrix} \begin{bmatrix} a_1 \\ a_2 \\ \vdots \\ a_N \end{bmatrix} = \begin{bmatrix} y^1 \\ y^2 \\ \cdots \\ y^M \end{bmatrix}$$

or in short, $$Sa=y \quad (3)$$

With M>N this system of linear equations is overdetermined, but we can find the solution where the length of Sa−y is minimal, which is equivalent of minimizing the mean square error. Also, Sa−y is minimal if and only if it is perpendicular to the N dimensional subspace of the M dimensional Euclidean space defined by S.

One possible solution based on these considerations is given by the Moore-Penrose pseudo-inverse, the best x in those terms can be obtained by $$S^T(Sa-y)=0$$

$$S^T Sa = S^T y$$

$$a=(S^T S)^{-1} S^T y \quad (4)$$

While creating the large N×M matrix is computationally too complex with the desired large training set of samples, we can dynamically maintain the N×N matrix $S^T S$ and the N dimensional vector $S^T y$ in the learning phase by starting with a nullmatrix and nullvector respectively and for each sample in the training set adding the diadmatrix $s^{yT} s^y$ to $S^T S$ and add $s^{yT} y^j$ to $S^T y$ where ($1 \leq j \leq M$). After the learning phase, we can calculate a vector (that is the coefficients) from the Moore-Penrose formula, and use them in the operational phase. If the $S^T S$ matrix has no inverse, that is the system of linear equations is underdetermined, we can still find one of the infinite solutions of the equation $S^T Sa = S^T y$.

When multiple filters are required for some image processing application (such as color demosaicing (one for each color plane), or resolution enhancement (one per subpixel), or when processing color images) two possible options are available. In one embodiment of this invention, each of the I filters can be treated individually and independently. In another embodiment of the invention, a single filter can be used that takes I*(n+1) samples with the following notation:

$$F_1(s_0, s_1, \ldots, s_n) = F\left(s_0, s_1, \ldots, s_n, \overset{n+1}{0}, \overset{n+2}{0}, \ldots, \overset{I*(n+1)-1}{0}\right)$$

$$F_2(s_0, s_1, \ldots, s_n) = F\left(\overset{0}{0}, \overset{1}{0}, \ldots, \overset{n}{0}, s_0, s_1, \ldots, s_n, \overset{2n+2}{0}, \ldots, \overset{I*(n+1)-1}{0}\right)$$

$$\ldots$$

$$F_I(s_0, s_1, \ldots, s_n) = F\left(\overset{0}{0}, \overset{1}{0}, \ldots, \overset{(I-1)(n+1)-1}{0}, s_0, s_1, \ldots, s_n\right)$$

The advantage of this method is that expected symmetries or codependencies of the different $F_i$ functions can be coded into the coefficients by selecting the f functions reflecting the expected symmetries or dependencies. Or, in general, if the a coefficients have a number of symmetry and other properties (for example that the sum of the subpixels should be equal to $s_0$), that can be formulated in L linear equations such as $$Ca=b$$

where L<N, the formula can be solved as $$C' = \begin{bmatrix} 1 & 0 & \cdots & 0 \\ 0 & 1 & & 0 \\ \cdots & & & 0 \\ 0 & \cdots & & 0 \\ c_{1,1} & c_{1,2} & \cdots & c_{1,N} \\ \cdots & & & \\ c_{l,1} & c_{l,2} & \cdots & c_{l,N} \end{bmatrix} \text{(size: } N \times N\text{)} \quad \underline{b}' = \begin{bmatrix} 0 \\ 0 \\ \cdots \\ 0 \\ b_1 \\ \cdots \\ b_L \end{bmatrix} \text{(size: } N\text{)}$$

$$E = \begin{bmatrix} 1 & 0 & \cdots & 0 \\ 0 & 1 & & 0 \\ \cdots & & & 0 \\ 0 & \cdots & & 1 \\ 0 & 0 & \cdots & 0 \\ \cdots & & & \\ 0 & 0 & \cdots & 0 \end{bmatrix} \text{(size: } N-L \times N\text{) and } \underline{a}' = \begin{bmatrix} a_1 \\ a_2 \\ \cdots \\ a_{N-L} \end{bmatrix} (N-L)$$

$$C'a = Ea' + b'$$

$$a = C'^{-1} Ea' + C'^{-1} b'$$

from which the original equation (3) is rewritten as $$Sa = y$$

$$S(C'^{-1} Ea' + C'^{-1} b') = y$$

$$SC'^{-1} Ea' = y - C'^{-1} b'$$

with,
$S' = SC'^{-1} E$ and $y' = y - C'^{-1} b'$ substitutions yield the $S'a' = y'$ overdetermined set of equations with S' being L×M in size which can be then solved as (3).

Most existing solutions using non-linear filters can be regarded as a specific case of the above class of F filter functions. For example, those that classify the signal based on the neighborhood (usually using a gradient filter) can be regarded as selecting a set of $f_{i,j}(s) = f'_j(s)s_i$ functions yielding $$y = \sum_j f'_j(s)(a_{0,j}s_0 + a_{1,j}s_1 + \ldots + a_{n,j}s_n) \quad (5)$$

$$y = \sum_j \left( f'_j(s) \sum_i a_{i,j}s_i \right)$$

such that for each s exactly one of the $f'_j(s)$ functions are 1, and the other ones are 0. The problem with those methods is that the resulting F function is not continuous, causing artifacts when a large area of samples of one class borders with another area of another class. To address continuity, in some variations, $f'_j(s)$ are not 1 or 0, but denote the "confidence" factor of $s_0$ and its neighborhood belonging to a specific class. The advantage of these methods is that only a relatively small number of non-linear f functions need to be computed for each sample neighborhood.

One consideration is that in the majority of the applications the filter function is expected to have the following invariance property (homogeneity):

$$F(\alpha s_0 + \beta, \alpha s_1 + \beta, \ldots, \alpha s_n + \beta, p_1, \ldots, p_m) = \alpha F(s_0, s_1, \ldots, s_n, p_1, \ldots, p_m) + \beta \quad (6)$$

It is easy to see that this can be accomplished with (5) only if it can be rewritten as follows:

$$y = s_0 + \sum_j \left( f_j''(\underline{s}) \sum_i a_{i,j}(s_i - s_0) \right) \quad (7)$$

where each $f'''$ function has the following property:

$$f'''(\alpha s_0+\beta, \alpha s_1+\beta, \ldots, \alpha s_n+\beta) = f'''(s_0, s_1, \ldots, s_n) \quad (8)$$

One approach therefore is to select f functions with such properties. Heuristic approaches such as gradient based methods or classifications comply with this constraint.

The concern remains if (7) may limit how well the ideal F function with the constraint of (6) can be approximated.

To address that concern, let's suppose we have a d "norm" function with the following property:
$d(\alpha s) = |\alpha| d(s)$—examples of such functions include the norm functions $d(s) = \sqrt{\Sigma s_i^2}$ or in general, $d(s) = \sqrt[k]{c_i \Sigma s_i^k}$ or $d(s) = \max(c_i |s_i|)$ It is easy to prove that (6) is true for a continuous F only if F can be rewritten as follows:

$$F(s_0, s_1, \ldots, s_n, p_1, \ldots, p_m) = \begin{cases} s_0 \mid \forall i : s_i = s_0 \\ s_0 + d'(\underline{s}) F' \left( \dfrac{s_1 - s_0}{d'(\underline{s})}, \dfrac{s_2 - s_0}{d'(\underline{s})}, \ldots, \dfrac{s_n - s_0}{d'(\underline{s})}, p_1, \ldots, p_m \right) \mid \text{otherwise} \end{cases}$$

where $d'(\underline{s}) = d(s_1-s_0, s_2-s_0, \ldots, s_n-s_0)$ and F' is an odd function for the s variables such that $F'(s_0, s_1, \ldots, s_n, p_1, \ldots, p_m) = -F'(-s_0, -s_1, \ldots, -s_n, p_1, \ldots, p_m)$.

As the most generic approach, F' can be well approximated with polynomials. As F' should be odd, it should only include the monomials of odd orders, so with the specific choice of $d'(\underline{s}) = \sqrt{\Sigma(s_i-s_0)^2}$ F it can be expressed as:

$$F(s_0, s_1, \ldots, s_n) = \\ s_0 + \sum a_i(s_i-s_0) + \sum a_{i,j,k} \dfrac{(s_i-s_0)(s_j-s_0)(s_k-s_0)}{\sum(s_i-s_0)^2} + \ldots = \\ s_0 + \sum a_i(s_i-s_0) + \sum_{j,k} \dfrac{(s_j-s_0)(s_k-s_0)}{\sum(s_i-s_0)^2} \left( \sum_i a_{i,j,k}(s_i-s_0) \right) + \ldots$$

which is exactly (7) with the special choice of f functions:

$$f_0'(\underline{s}) = 1,$$
$$f_{j,k}'(\underline{s}) = \dfrac{(s_j-s_0)(s_k-s_0)}{\sum(s_i-s_0)},$$
$$f_{j,k,l,m}'(\underline{s}) = \dfrac{(s_j-s_0)(s_k-s_0)(s_l-s_0)(s_m-s_0)}{(\sum(s_i-s_0)^2)^2}, \ldots$$

This proves that filters in the form of (7) can approximate the ideal F function arbitrarily well.

However, this formula is still too generic, yielding too many coefficients and respective monomials even at order 3. One pruning option is to consider approximation only until order 1 monomials which yields the class of well known convolutions. A natural extension of linear convolutions therefore is selecting all, or selected monomials for j, k gives us f' functions $$f_{j,k}(\underline{s}) = \dfrac{(s_j-s_0)(s_k-s_0)}{\sum(s_i-s_0)}$$

Note that the fact that the norm function needs to be calculated only once per sample and neighborhood and is reused in each f primary function further reduces computational complexity.

Other good choices for the f' functions at order 3 approximations after these considerations (using other reformulations or different norm functions) are $$\dfrac{\sum c_{ij}|s_i - s_j|^k}{\sum c_i |s_i - s_0|^k} \text{ or } \dfrac{\sum c_{ij}|s_i - s_j|^k}{\max(c_i|s_i - s_0|^k)} \text{ for some } k \in N \quad (9)$$

Let's notice that specific choices of i, j pairs will generate functions that will in a sense measure "directions" in arrays; such as where the corresponding samples line up in some direction in the neighborhood of $s_0$. However, instead of heuristics used in earlier methods, this apparatus can take a statistical approach and simply identify the best such monomials and the best linear combinations thereof from pure mathematical and statistical considerations without making those a-priori assumptions about directions and gradients; therefore it is not limited to image processing.

The norm function may vary depending on the type of the correlation of the neighborhood. When the signal is a color array or a color mosaic, there are different approaches:
 a) treat each color channel as separate problems
 b) treat each color channel as the third (fourth) dimension in the neighborhood
 c) treat the problem as each s is a vector rather than a scalar value Approach a) is a good approach although it may not be able to exploit certain correlations among the color channels. b) and c) are formally different, but technically very similar; the choice of a good "norm" function is key. Consider $s_i = (s_i^r, s_i^g, s_i^b)$ in the case of a color array. One good approach may be to consider norms adapted to the correlations such as $$d''^r(\underline{s}) = \sqrt[k]{c_i^{r,r} \sum (s_i^r - s_0^r)^k + c_i^{r,g} \sum (s_i^g - s_0^g)^k + c_i^{r,b} \sum (s_i^b - s_0^b)^k}$$

and in general only subtract sample values belonging to the same channel in (9). Similar considerations should be used with other type of correlations, such as a color mosaic obtained by a Bayer filter.

Illustrative Example

In an illustrative example, a known high resolution progressive scan television sample is utilized in the learning phase and determines the best coefficients to be used in an operational phase for deinterlacing a low resolution interlaced television signal. According to FIG. 2, a known high resolution progressive scan television signal (1080p) sample 210 is provided in a learning phase. The 1080p sample 210 is down-sampled to a low resolution interlaced (480i) target sample 220. Knowing that a transform comprising a combination of deinterlacing and resolution enhancing functions must be performed to reconstruct the 1080p sample 210 from the 480i sample, the known values of the 1080i sample 210 and the 480i sample are applied to the transform 230 to determine optimal coefficients 240 for the transform 230.

Figure 2:
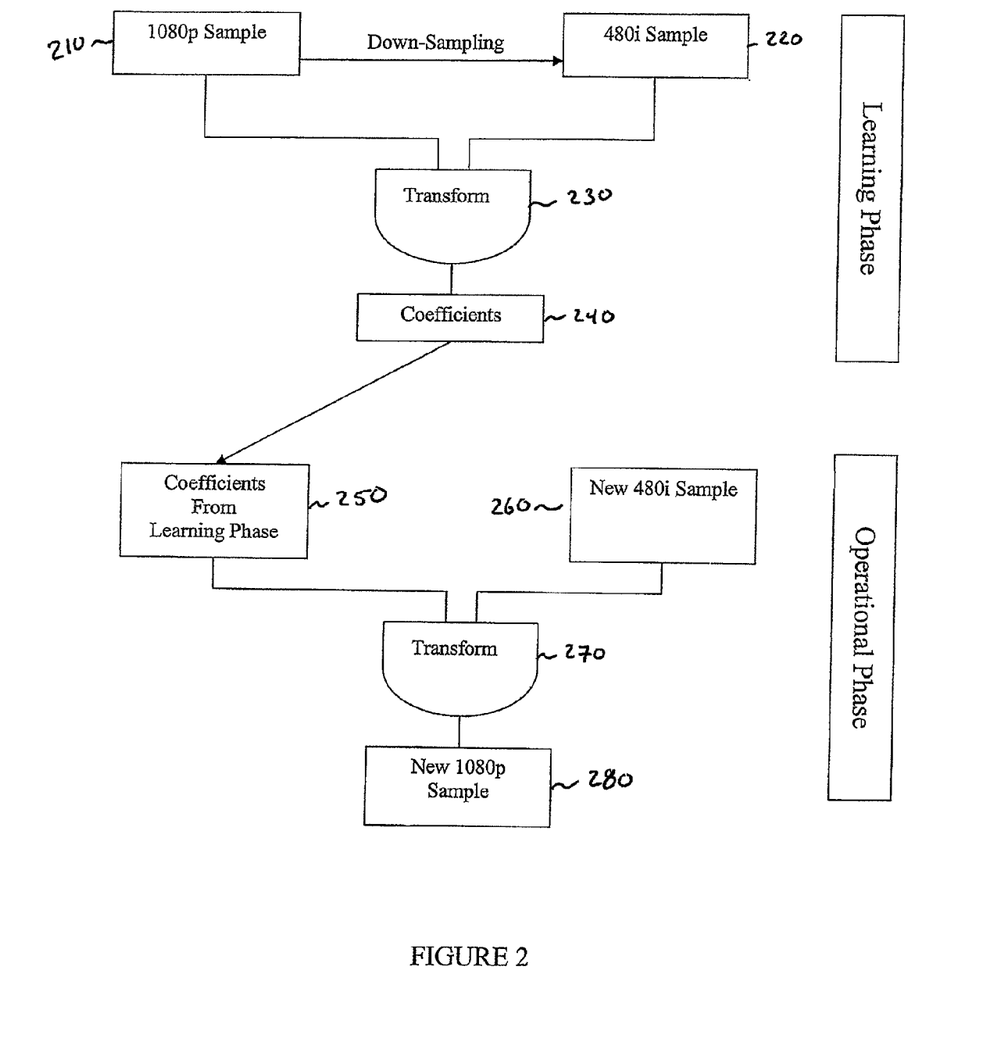
FIG. 2 illustrates an exemplary process of defining optimal coefficients in a learning phase and applying the coefficients to a new sample in an operational phase according to the present invention.

Once the learning phase finds the optimal coefficients 240 they are used in the operational phase. A new low resolution interlaced sample (New 480i) 260 and the optimal coefficients 250 are applied to the transform 270. The transform 270 is the same set of deinterlacing and resolution enhancing functions as transform 230. Therefore, the resultant output of the transform 230 is a new high resolution progressive scan television signal (New 1080p) 280 representative of the original 1080p sample.

System for Processing

The process of using a training set of data to optimize the filter function to be applied to a target signal may be incorporated within a computing system according to some embodiments of the present invention. The schematic functionality of this apparatus is represented in FIG. 3.

Figure 3:
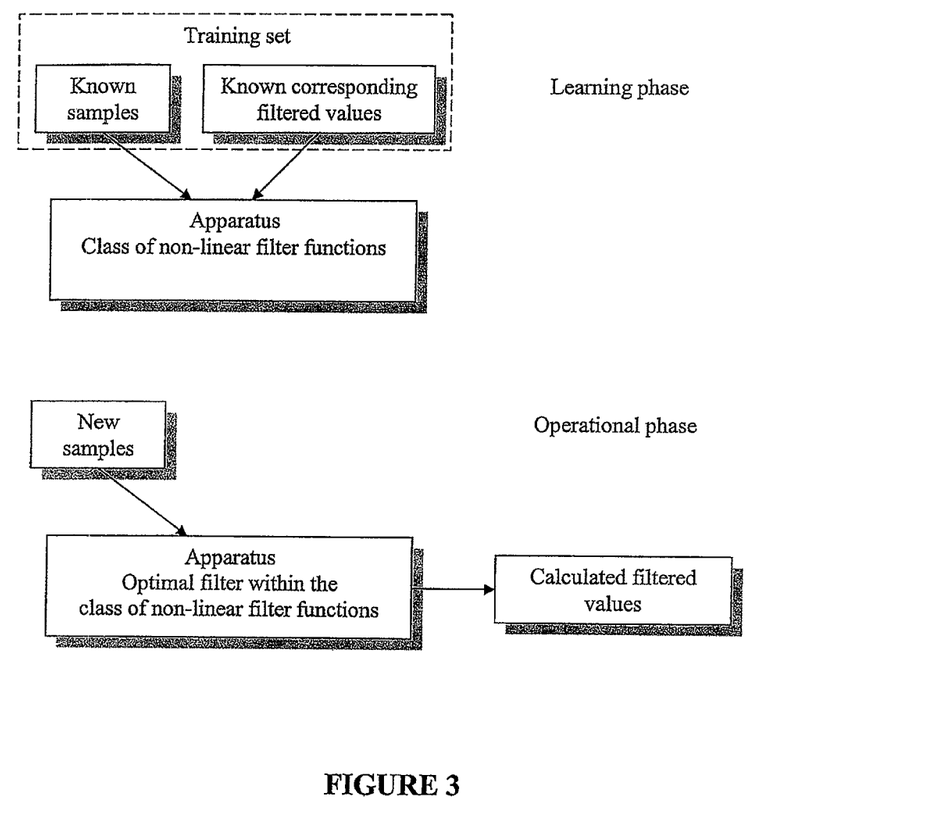
FIG. 3 illustrates the schematic functionality of an apparatus for defining optimal coefficients in a learning phase and applying the coefficients to a new sample in an operational phase according to the present invention.
Figure 4:
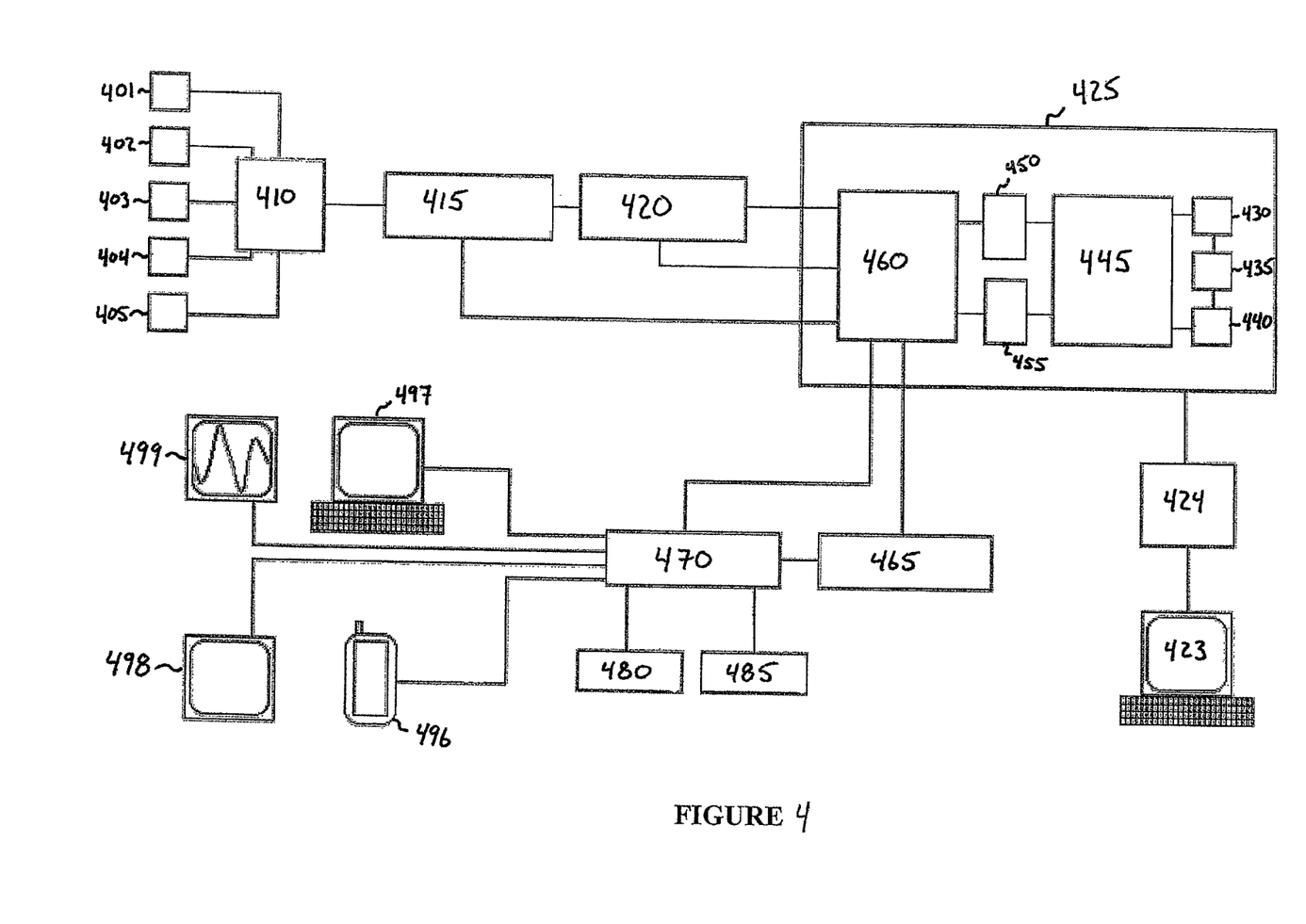
FIG. 4 is a block diagram illustrating the exemplary image enhancement system in accordance with the present invention.

One exemplary apparatus whose functionality is described in FIG. 3 is portrayed in FIG. 4. FIG. 4 is a block diagram illustrating the exemplary image enhancement system 400 in accordance with the present invention. The system 400 is comprised of a content transform apparatus 425 used to transform the content from sources 401, 402, 403, 404 and/or 405 and output a transformed sample. In some embodiments of the present invention, more than one content-type is able to be transformed by the content transform apparatus 425. In some embodiments, content source 401 is a still image capture device, such as a digital camera having a Bayer filter or another appropriate color filter, content source 402 is a digital video capture device, content source 403 is a streaming video source, content source 404 is a computer-generated video source and content source 405 is 3-dimensional medical imaging device such as a MRI device. It will be readily apparent to those having ordinary skill in the art that, although specific examples of signal sources are given, any appropriate signal source, now known or later developed, may similarly be processed by the content transform apparatus 425 of the present invention.

In some embodiments of the present invention, content from the content sources 401, 402, 403, 404 and/or 405 is gathered by the raw data collector 410. Also, in some embodiments, the data is stored in a pre-processing memory device 415. Furthermore, a pre-processor 420 is utilized in some embodiments of the present invention to conduct preliminary processing on data from the content sources 401, 402, 403, 404 and/or 405. In some embodiments of the present invention, the preliminary processing includes performing an anti-aliasing step on the data. In some embodiments, pre-processing compression or decompression is performed on the data in the pre-processor. In yet other embodiments of the present invention, multiple pre-processing steps are conducted on the signal data in the pre-processor 420. Furthermore, although specific examples of pre-processing are disclosed, it will be readily apparent to those having ordinary skill in the art that any appropriate pre-processing function, now known or later developed, may be accomplished by the pre-processor 420.

In some embodiments of the present invention, the content transform apparatus 425 includes: a known sample memory 430, a down-sampling processor 435, a target sample memory 440 and a learning phase processor 445. According to the method described above, known samples from the known sample memory 430 are down-sampled with the down-sampling processor 435, resulting in target samples, which are stored in the target sample memory 440. Known samples and target samples are accessed from the known sample memory 430 and the target sample memory, respectively by the learning phase processor 445. Likewise, transforms are loaded into the learning phase processor 445 from the transform memory 450 and a learning phase step is performed, resulting in known optimal coefficient values. The known optimal coefficient values are stored in a coefficient memory 455.

Preferably, the actions performed by the content transform apparatus 425 are controlled by a controller 424. In some embodiments of the present invention, the controller 424 is coupled to a user interface 423.

Upon determining optimal coefficient values in the learning phase, the operational phase processor 460 loads the same transforms form the learning phase from the transform memory 450, as well as the coefficients from the coefficient memory 455. Furthermore, content data is delivered to the operational phase processor 460 from one or more content source 401, from the raw data collector 410, from the pre-processing memory device 415 and/or the pre-processor 420. Upon loading, an operational phase transform is performed, resulting in transformed output data representative of the known samples.

In some embodiments of the present invention, at least one non-linear filter function is used during the learning phase and the operational phase. In the preferred embodiment of the present invention, learning phase and the operational phase utilize the transform described in the exemplary embodiment from above, as defined by equations (1)-(9).

In some embodiments of the present invention, the transformed output data is directly outputted to output 470. In other embodiments, a post-processor 465 is provided to perform ancillary processing on the enhanced signal data. Once outputted, the transformed output data is stored in an output memory 480 or sent directly to output devices 496, 497, 498 and/or 499, or both. According to some embodiments, output device 496 is a personal data assistant (PDA) or Smartphone (such as a Blackberry™ device manufactured by RIM® or the iphone™ manufactured by Apple®), output device 497 is a computer or television monitor, output device 498 is a medical apparatus imaging device, and output 499 is a streaming video signal available over a computer network, such as the internet. Although specific examples of output devices are disclosed, it will be readily apparent to those having ordinary skill in the art that any appropriate output device, now known or later developed, is envisioned for use as an output device according to the present invention. In some embodiments, the enhanced signal is outputted to an additional peripheral device 485.

"Reslet" Transformations

In some embodiments of the present invention, a "reslet" transformation is utilized for content enhancement. The effectiveness of wavelet based compression methods currently used take advantage of the fact that a subsampled image (using a low-pass filter) can be reconstructed to an image of the original resolution with an appropriate inverse filter; and the difference from this approximation is equivalent of a high-pass filter; from the combination of the two datasets the original image can be properly reconstructed. The difference tends to be minimal for the majority of the samples, which decorrelates the image well, making this transformation a good candidate for image compression. This view however forecasts that better methods that approximate the original image from the subsampled version will produce better compression results. According to some embodiments of the present invention, a resolution enhancement technique is disclosed that can produce a good approximation of the original image from a subsampled set (by a 2× factor in both dimensions).

Figure 5:
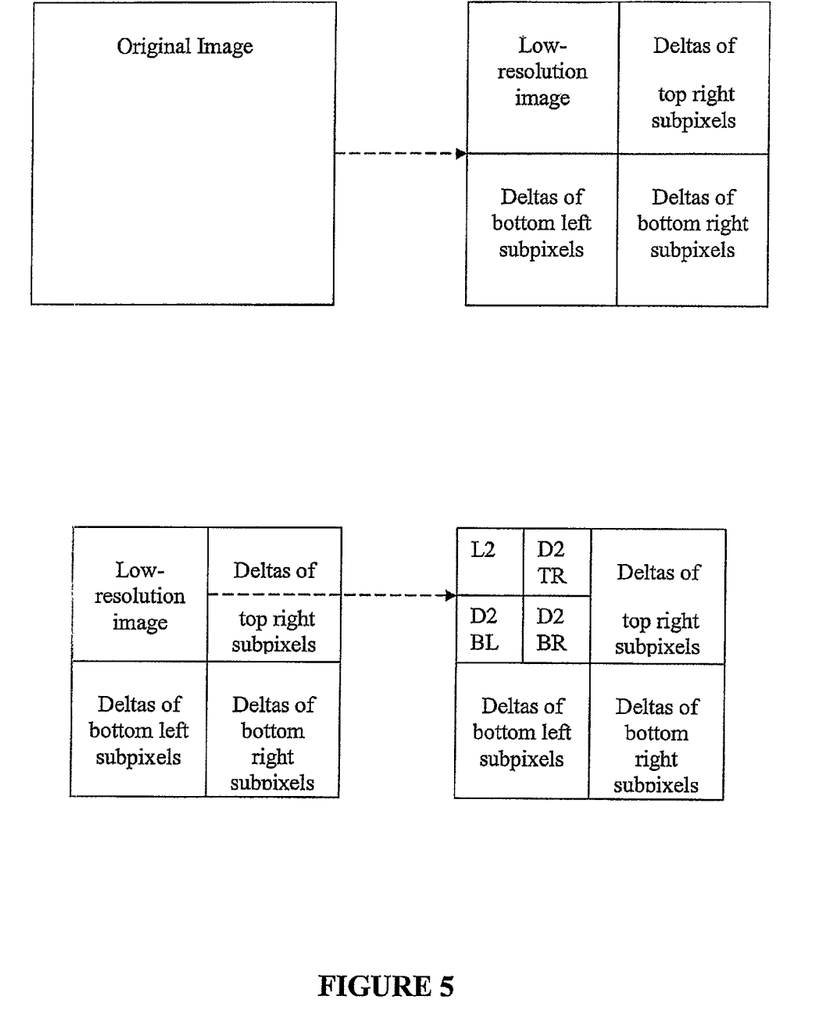
FIG. 5 illustrates a schematic representation a "reslet" transform technique in accordance with some embodiments the present invention.

FIG. 5 illustrates a schematic representation a "reslet" transform technique. Given a resolution enhancement technique that can produce a good approximation of the original image from a subsampled set (by a 2× factor in both dimensions) one step of the transform is the following:

The top left quarter of the image becomes the subsampled image using the "box convolution kernel", that is each pixel is obtained by the average or the sum of the 2×2 original pixels of the high-resolution image.

The top right corner is obtained by the "delta", the difference between the original top right pixel of each corresponding low-res pixel, and the approximation by the resolution enhancement filter. Similarly, the bottom left and bottom right pixels are the error of the approximation method for the corresponding subpixels.

Then, similarly to a Wavelet transform, the top left subsampled image is recursively transformed again and again for a preset number of iterations or until a preset threshold size is reached.

For the inverse transformation in each step the large image is approximated from the top left subsampled image; then the delta is applied for the top right, bottom left and bottom right subpixels. There is no "delta" for the top left subpixel, but at the last step, as the sum of the 4 pixels should be equal to 4× the subsampled pixel, the top left pixel value should be adjusted accordingly. This will fully restore the original image without rounding errors.

The wavelet transformation of any wavelet-based compression methods can be replaced by the above defined "reslet" transformation, and therefore any known compression method can be used.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. An apparatus for content-processing filtering in an operational phase that is capable of learning from a training set of known discrete content signals and desired transform values by finding the best coefficients for a transform in a learning phase, comprising:
at least one memory having stored therein at least one transform;
at least one processor; and
computer-readable instructions, which when executed by said processor, apply said at least one transform to received content data;
wherein the at least one transform comprises linear combinations of pre-selected non-linear functions, and
wherein the at least one transform is in the format of:

$$y = a_0 s_0 + a_1 s_1 + \ldots + a_n s_n + f_1(s)(a_{1,0} s_0 + \ldots + a_{1,n} s_n) + f_2(s)(a_{2,0} s_0 + a_{2,1} s_1 + \ldots + a_{2,n} s_n) + \ldots$$

where:
$s_i (1 \leq i \leq N)$ are the discrete values of a given neighborhood of $s_0$ and $p = p_1, p_2, \ldots, p_m$ are optional additional parameters and $f_i(s,p)$ $(1 \leq i \leq N)$ are the selected primary filter functions and wherein each specific set of $a_i$ coefficients defines a specific filter function; and
wherein the functions have the property of $f(as+c) = f(s)$ for each scalar a and c values where s+c denotes the vector $(s_0+c, s_1+c, \ldots, s_n+c)$ and $$\sum_{0 \leq i \leq n} a_i = 1$$

as well as $$\sum_{0 \leq i \leq n} a_{k,i} = 1,$$

and the desired filter function is in the format of:

$$F(as+c) = aF(s) + c.$$

2. The apparatus for content processing filtering according to claim 1, wherein the transform allows fast calculations in the operational phase.

3. The apparatus for content processing filtering according to claim 1,
$f(as+c) = f(s)$ s+c $(s_0+c, s_1+c, \ldots, s_n+c)$ $\Sigma a_i = 1$ $0 < i < n$ $\Sigma a_{k,i} = 1$ $0 < i < n$ wherein the linear combination is rearranged as follows, biased to $s_0$:

$$y - s_0 = a_1(s_1 - s_0) + \ldots + a_n(s_n - s_0) + f_1(s)(a_{1,1}(s_1 - s_0) + \ldots + a_{1,n}(s_n - s_0)) + \ldots,$$

thus optimizing this biased variation.

4. The apparatus for content processing filtering according to claim 1, wherein the functions have the format of:

$$\frac{\sum c_{ij} |s_i - s_j|^k}{\sum c_i |s_i - s_0|^k} \text{ or } \frac{\sum c_{ij} |s_i - s_j|^k}{\max(c_i |s_i - s_0|^k)} \text{ for some } k \in N.$$

5. The apparatus for content processing filtering according to claim 4, wherein the content comprises a neighborhood of pixels, and wherein the neighborhood of pixels is specifically defined by a set of pixels in the proximity of a base pixel $s_0$ wherein the functions have nonzero $C_{ij}$ values only for i,j pairs that line up in a specific direction within a two-dimensional array of pixels.

6. The apparatus for content processing filtering according to claim 5, wherein the neighborhood of pixels is selected from among a 3×3 neighborhood of a two dimensional array of pixels, a 5×5 neighborhood of a two dimensional array of pixels, a 3×3×3 neighborhood of a three dimensional array of pixels and a 5×5×5 neighborhood of a three dimensional array of pixels.

7. The apparatus for content processing filtering according to claim 5, wherein the neighborhood of pixels is selected from among a m×m×m neighborhood of a two dimensional array of pixels and a m×m×m neighborhood of a three dimensional array of pixels, wherein m is an integer.

8. The apparatus for content processing filtering according to claim 5, wherein a discrete content signal is selected from among an image signal and a video signal, and wherein the filter further comprises a. a continuous sample value with a point defined by the coordinates x,y within a set of pixels.
b. subpixels within the set of pixels, in the form of n*k supersampling;
wherein the training set is created by downscaling the discrete content signal, resulting in downscaled content, and providing the downscaled content and each subpixel or specific values at x,y of the original discrete content signals for the learning process, using linear combinations of arbitrarily selected non-linear filters.

9. The apparatus for content processing filtering according to claim 1, wherein the discrete content signal is three dimensional in space, and wherein the content processing filtering comprises adding slices to a non-isotropic medical dataset for optimal three dimensional volume reconstruction.

10. The apparatus for content processing filtering according to claim 9, wherein the medical dataset is selected from among MRI image data and CT image data.

11. The apparatus for content processing filtering according to claim 8, wherein the content is used in consumer electronic devices.

12. The apparatus for content processing filtering according to claim 11, wherein the consumer electronic devices are selected from among digital cameras and scanners.

13. The apparatus for content processing filtering according to claim 1, wherein the content is a video stream, wherein the video stream is three dimensional in time and space, and wherein all three dimensions are utilized for transforming two dimensions of the content.

14. The apparatus for content processing filtering according to claim 3, wherein the content is obtained from a capture device utilizing a Bayer filter, and wherein the content is transformed with filter values for de-mosaicking the content.

15. The apparatus for content processing filtering according to claim 14, wherein the content comprises a neighborhood of pixels, and wherein the neighborhood of pixels is specifically defined by a set of pixels in the format of:

$g_{-2,-2}$ $b_{-2,-1}$ $g_{-2,0}$ $b_{-2,1}$ $g_{-2,2}$
$r_{-1,-2}$ $g_{-1,-1}$ $r_{-1,0}$ $g_{-1,1}$ $r_{-1,2}$
$g_{0,-2}$ $b_{0,-1}$ $g_{0,0}$ $b_{0,1}$ $g_{0,2}$
$r_{1,-2}$ $g_{1,-1}$ $r_{1,0}$ $g_{1,1}$ $r_{1,2}$
$g_{2,-2}$ $b_{2,-1}$ $g_{2,0}$ $b_{2,1}$ $g_{2,2}$
wherein $$r'_{0,0} = \frac{r_{-1,0} - r_{1,0}}{2}$$

$$b'_{0,0} = \frac{b_{0,-1} - b_{0,1}}{2}$$

$$r_{0,0} = r'_{0,0} + \sum a'_{i,j}(g_{i,j} - g_{0,0}) + \sum a^r_{i,j}(r_{i,j} - r'_{0,0}) + \sum a^b_{i,j}(b_{i,j} - b'_{0,0}) + f(s)\left(\sum a^g_{i,j}(g_{i,j} - g_{0,0}) + \sum a^r_{i,j}(r_{i,j} - r_{0,0}) + \sum a^b_{i,j}(b_{i,j} - b_{0,0})\right) + \ldots$$

and wherein the transforms in the format of:

$$\frac{\alpha((g_{-1,-1} - g_{0,0})^2 + (g_{0,0} - g_{1,1})^2) + \beta(g_{-1,-1} - g_{1,1})^2 + \gamma((r_{-1,0} - r_{1,-2})^2 + (r_{-1,2} - r_{1,0})^2 + (b_{-2,1} - b_{0,-1})^2 + (b_{0,1} - b_{2,-1})^2)}{\sum a^g_{i,j}(g_{i,j} - g_{0,0})^2 + \sum a^r_{i,j}(r_{i,j} - r'_{0,0})^2 + \sum a^r_{i,j}(b_{i,j} - b'_{0,0})^2}.$$

16. The apparatus for content processing filtering according to claim 1, wherein the transform removes artifacts of content signals that turn noisy, or digital compression, wherein the transform is taught using a training set containing corresponding noisy and original images in the learning phase.

17. The apparatus for content processing filtering according to claim 1, wherein the transform comprises image enhancement filters selected from among filters for edge enhancement, sharpening, edge detection and zooming.

18. The apparatus for content processing filtering according to claim 1, further comprising:
a pre-emphasis phase and a de-emphasis phase for both the learning phase and the operational phase, wherein the pre-emphasis phase and the de-emphasis phase utilize an appropriate filter pair.

19. The apparatus for content processing filtering according to claim 18, wherein the filter pair comprises an edge enhancement linear convolution filter and its inverse convolution.

20. The apparatus for content processing filtering according to claim 1, further comprising a system for compressing content data using reslet techniques where a low-pass filter and a high-pass filter of a wavelet method is replaced with a down-sampling and deltas to the reslet method, wherein a reslet comprises a resolution enhancement transform capable of producing a good approximation of an original object from a sub-sampled set.

* * * * *